(12) United States Patent
Ginther

(10) Patent No.: US 9,546,494 B2
(45) Date of Patent: Jan. 17, 2017

(54) PORTABLE AIRCRAFT STORAGE SYSTEM

(71) Applicant: Michael P. Ginther, Lemmon, SD (US)

(72) Inventor: Michael P. Ginther, Lemmon, SD (US)

(*) Notice: Subject to any disclaimer, the term of this patent is extended or adjusted under 35 U.S.C. 154(b) by 87 days.

(21) Appl. No.: 14/248,705

(22) Filed: Apr. 9, 2014

(65) Prior Publication Data
US 2015/0292224 A1 Oct. 15, 2015

(51) Int. Cl.
*E04H 6/04* (2006.01)
*B65B 33/04* (2006.01)
*E04H 6/44* (2006.01)
*B64F 1/00* (2006.01)

(52) U.S. Cl.
CPC ............ *E04H 6/04* (2013.01); *B64F 1/005* (2013.01); *B65B 33/04* (2013.01); *E04H 6/44* (2013.01)

(58) Field of Classification Search
CPC ............ E04H 6/04; E04H 6/00; E04H 6/12; E04H 6/44; E04B 2001/34389; E04B 1/342; E04B 1/3442; E04B 1/343; E04B 1/344; E04B 1/3431; E04B 1/34384; E04B 1/34357; B64F 1/005
See application file for complete search history.

(56) References Cited

U.S. PATENT DOCUMENTS

| | | | |
|---|---|---|---|
| 1,470,557 A | 10/1923 | Eremeeff | |
| 2,992,709 A | 7/1961 | McIntosh | |
| 3,034,607 A * | 5/1962 | Haines, Jr. | 52/64 |
| 3,248,830 A | 5/1966 | Maynard | |
| 3,555,748 A | 1/1971 | Herman | |
| 3,708,200 A | 1/1973 | Richards | |
| 3,739,537 A | 6/1973 | Barnes | |
| 3,818,652 A | 6/1974 | Pierce | |
| 3,838,879 A * | 10/1974 | Lilly | 52/143 |
| 4,234,143 A | 11/1980 | Pesando | |
| 5,119,935 A | 6/1992 | Stump | |
| 8,484,908 B2 * | 7/2013 | Hache | 52/143 |
| 8,695,285 B2 * | 4/2014 | Reinmann et al. | 52/79.5 |
| 8,701,356 B2 * | 4/2014 | Forsland et al. | 52/66 |
| 2003/0115808 A1 * | 6/2003 | Morrow | 52/64 |
| 2007/0170740 A1 * | 7/2007 | Di Franco | 296/26.13 |
| 2009/0300997 A1 * | 12/2009 | Scheps | 52/67 |
| 2014/0157685 A1 * | 6/2014 | Fagan | 52/79.5 |

OTHER PUBLICATIONS http://hydroswing-hydraulic-doors.com/container-doors; ISO Shipping Container Doors Webpage from Hydroswing; Received and Printed on Apr. 7, 2014.

* cited by examiner

*Primary Examiner* — Jessica Laux
(74) *Attorney, Agent, or Firm* — Neustel Law Offices; Michael S. Neustel

(57) ABSTRACT

A portable aircraft storage system for storing aircraft. The portable aircraft storage system generally includes a container having an enclosed space therein. The container has several connected walls including a top wall, a bottom wall, a rear wall, a first side wall and a second side wall. A door is connected to the top wall by a hinge. The door rotates about the hinge between an open and a closed position. A front sliding section is coupled to the door. The front sliding section slides into and out of the enclosed space. A rear sliding section is coupled to the rear wall. The rear sliding section slides into and out of the enclosed space.

14 Claims, 10 Drawing Sheets

PORTABLE AIRCRAFT STORAGE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to buildings for storing airplanes and more specifically it relates to a portable aircraft storage system for storing aircraft.

Description of the Related Art

Any discussion of the related art throughout the specification should in no way be considered as an admission that such related art is widely known or forms part of common general knowledge in the field.

Various types of buildings such as airplane hangars have been used to provide shelter for airplanes and protection from vandalism, theft and weather. Traditional airplane hangars have been large fixed structures that are specifically designed for a certain size aircraft and are expensive to build. One problem with the prior art airplane hangars is that they are not portable. If a hangar is needed temporally in one location, there is no way to temporarily provide an airplane hangar. An airplane hangar cannot be moved from one location to another. Another problem with the prior art airplane hangars is that they are costly to construct. Because airplane hangars are constructed in low volumes, they are essentially a custom product and are not suitable for the cost reductions possible with high volume manufacturing.

Because of the inherent problems with the related art, there is a need for a new and improved portable aircraft storage system for storing aircraft.

BRIEF SUMMARY OF THE INVENTION

The invention generally relates to a portable aircraft storage system for storing aircraft. The portable aircraft storage system includes a container having an enclosed space therein. The container has several connected walls including a top wall, a bottom wall, a rear wall, a first side wall and a second side wall. A door is connected to the top wall by a hinge. The door rotates about the hinge between an open and a closed position. A front sliding section is coupled to the door. The front sliding section slides into and out of the enclosed space. A rear sliding section is coupled to the rear wall. The rear sliding section slides into and out of the enclosed space.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
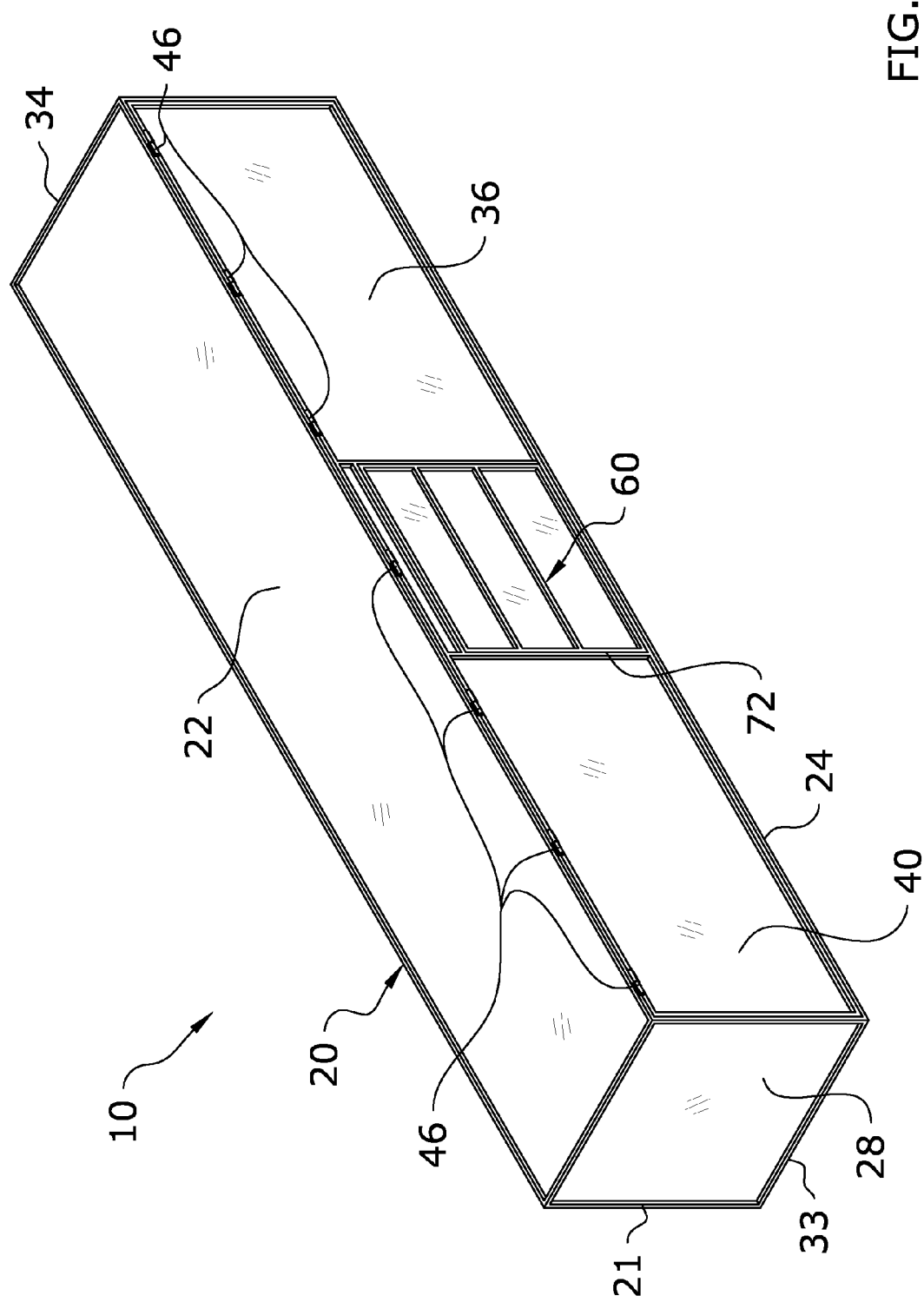
FIG. 1 is an overall upper front perspective view of a portable aircraft storage container of the present invention with the sliding sections in a retracted position.
Figure 2:
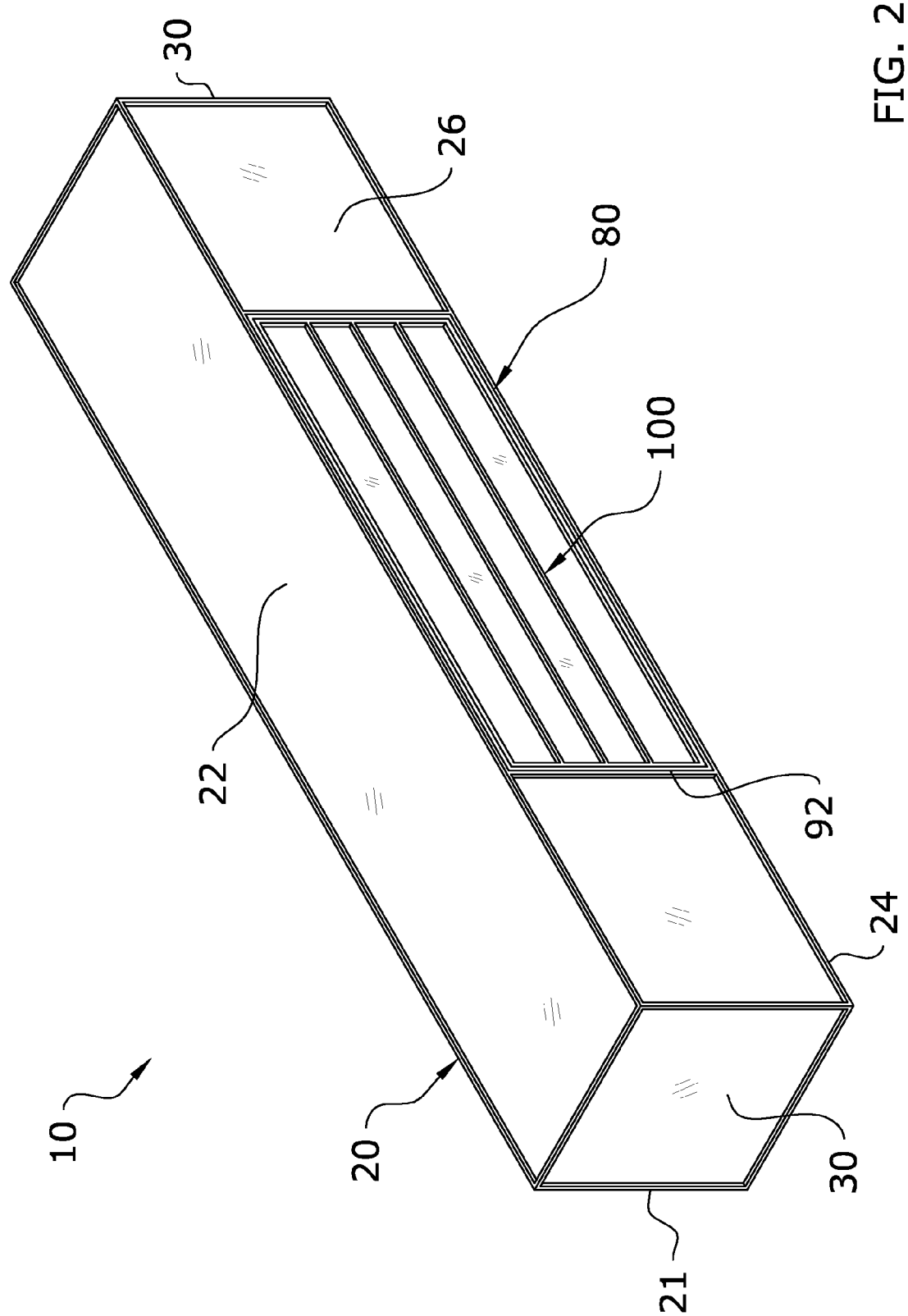
FIG. 2 is an overall upper rear perspective view of FIG. 1.
Figure 3:
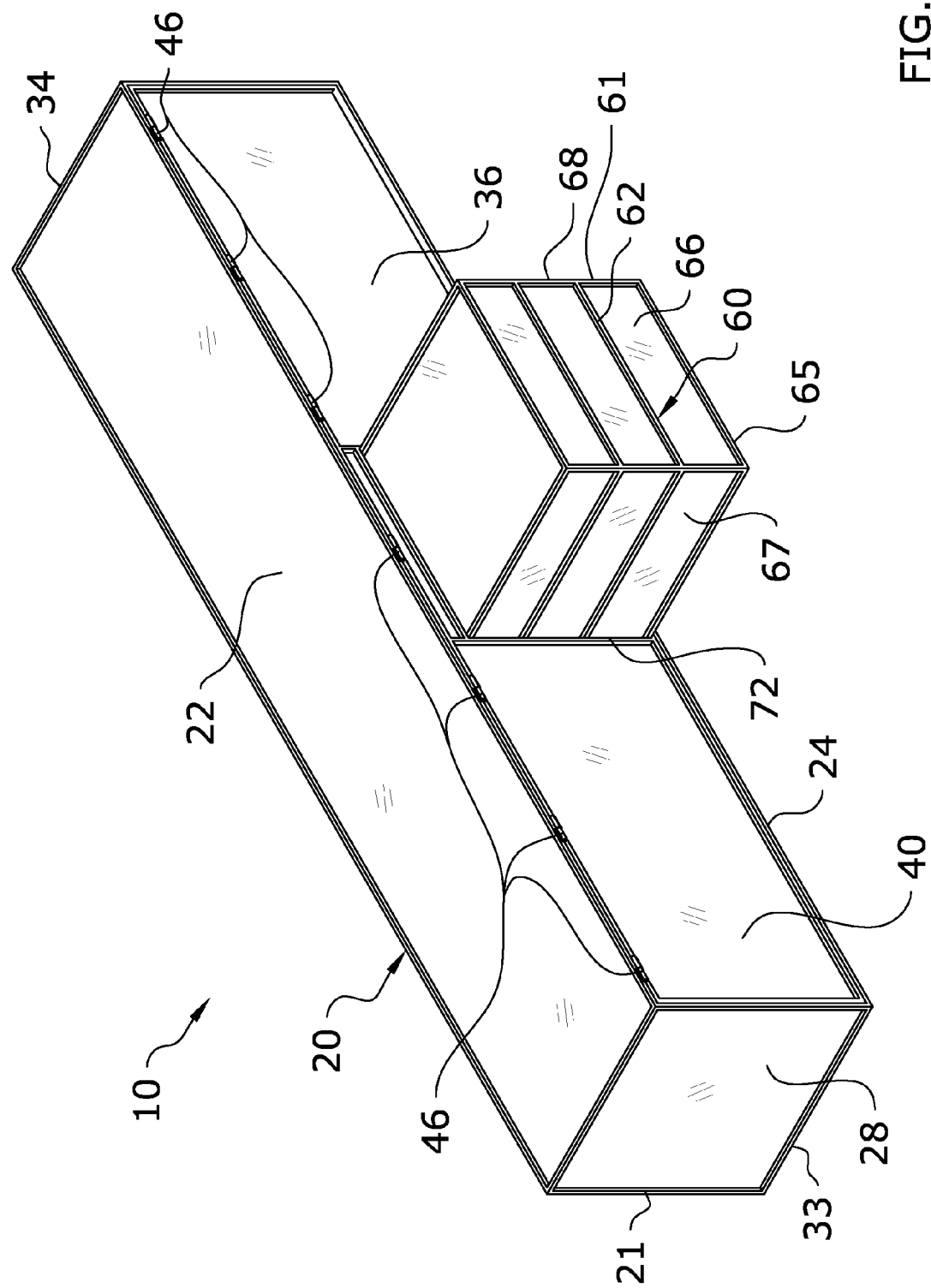
FIG. 3 is an overall upper front perspective view the present invention with the front sliding section in an extended position.

A. Overview.

Turning now descriptively to the drawings, in which similar reference characters denote similar elements throughout the several views, FIGS. 1 through 10 illustrate a portable aircraft storage system 10 that can be used to store an airplane 150. The portable aircraft storage system 10 comprises a housing or container 20 having an enclosed space 38 therein. The container 20 has several connected walls including a top wall 22, a bottom wall 24, a rear wall 26, a first side wall 28 and a second side wall 30. A front wall or door 40 is connected to the top wall 22 by hinges 46. The door 40 rotates about the hinges 46 between an open and a closed position. A front sliding section 60 is coupled to the door 40. The front sliding section 60 slides into and out of the enclosed space 38. Rear sliding sections 80 and 100 are coupled to the rear wall 26. The rear sliding sections 80, 100 slide into and out of the enclosed space 38.

B. Portable Aircraft Storage System Container.

FIGS. 1 through 4 illustrate the container 20, the front sliding section 60 and the rear sliding section 80. The housing or container 20 is generally rectangular in shape when the sliding sections 60 and 80 are in a retracted position. Container 20 has a rectangular shaped frame 21 and planar walls that are connected to frame 21. The walls include a top wall 22, a bottom wall 24, a rear wall 26, a first side wall 28 and a second side wall 30. Top wall 22 and bottom wall 24 are parallel and spaced apart from each other. Side walls 28 and 30 are parallel and spaced apart from each other. Top wall 22 and bottom wall 24 are perpendicular to side walls 28 and 30 and to rear wall 26. The container 20 has ends 33 and 34 and inside surfaces 35 and outside surfaces 36. The inside surface 35 of the bottom wall 24 forms a floor 39. A front wall or door 40 is connected to the top wall 22 by hinges 46. The door 40 rotates about the hinge 46 between an open and a closed position. The frame 21, walls 22-30 and door 40 define an enclosed space 38 within container 20. Container 20 can be formed from suitable materials such as steel. In one embodiment, the walls 22-30 are connected to frame 21. In another embodiment, the walls 22-30 are directly connected to each other.

C. Front Sliding Section.

With continued reference to FIGS. 1 through 4, the portable aircraft storage system 10 further comprises a front sliding section 60 that is coupled for sliding movement to the door 40. The front sliding section 60 slides into and out of the enclosed space 38. The front sliding section 60 has a case 61 that is formed by support tubes 62 and that is covered by several panels. Front sliding section 60 is generally square to rectangular in shape. Tubes 62 are covered by a top panel 64, a bottom panel 65, a front panel 66, a first side panel 67 and a second side panel 68. The panels are generally oriented to define an enclosed cavity 70 (FIG. 8) within the front sliding section 60. Front sliding section 60 can be formed from suitable materials such as steel. An opening 72 is defined in door 40. Opening 72 is dimensioned to receive front sliding section 60. Front sliding section 60 can be manually moved through opening 72 between an extended position away from door 40 and a retracted position within container 20. In the extended position, cavity 70 is contiguous with enclosed space 38. In an embodiment, front sliding section 60 is supported for sliding movement relative to container 20 by a track (not shown).

Figure 8:
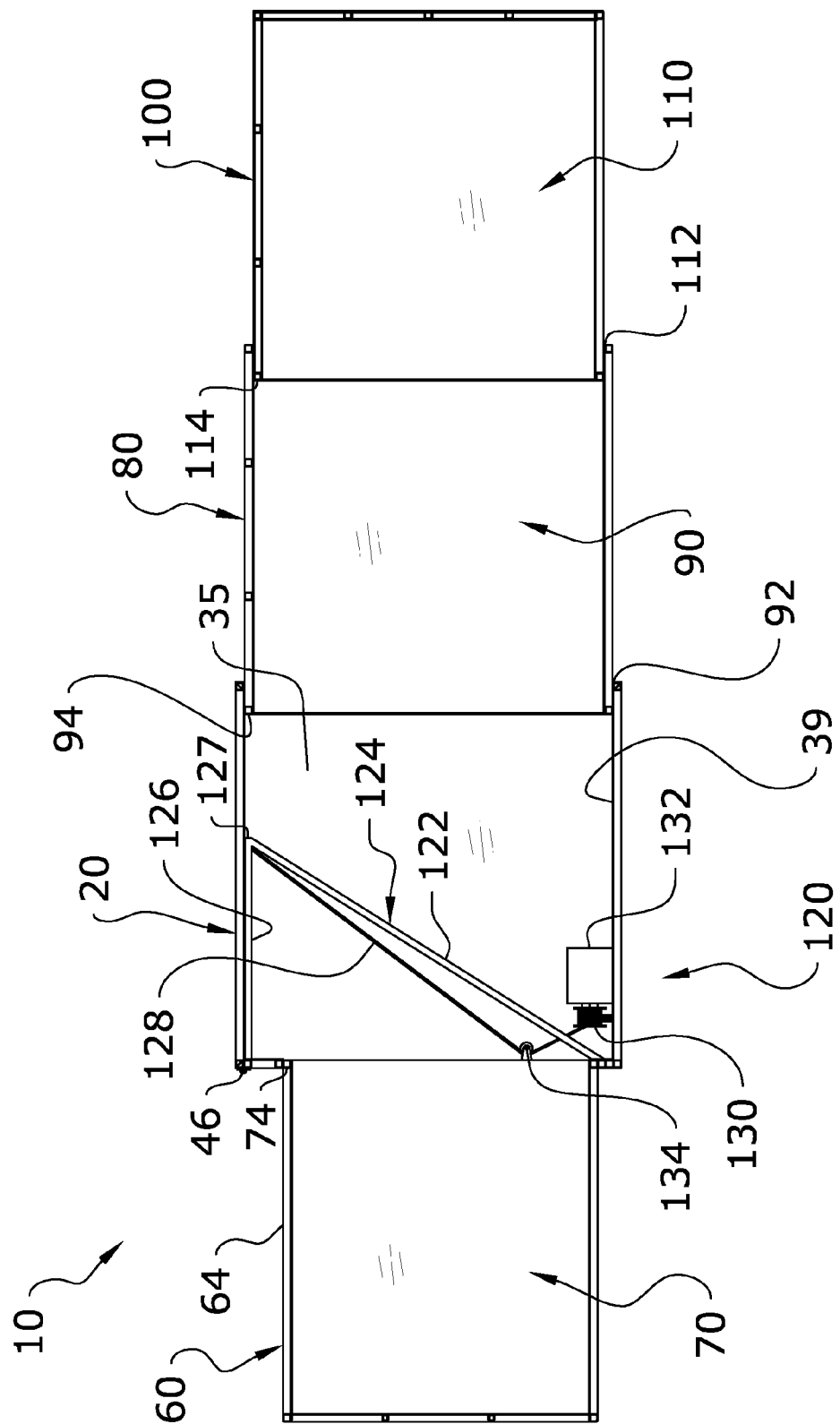
FIG. 8 is a side cross-sectional view of the aircraft storage container taken along section line 8-8 of FIG. 7 with the front sliding section in an extended position and the rear sliding sections in an extended position.

In one embodiment, front sliding section 60 is retained in an extended position by a locking mechanism 74 (FIG. 8). The locking mechanism 74 is connected to tubes 62 and can be selectively engaged with door 40. In another embodiment, front sliding section 60 is selectively retained in an extended position by a pair of braces 75. Each brace 75 is positioned on opposite sides of section 60. Braces 75 have a support arm 76 and support posts 78. One end of arm 76 is connected to the outer surface of door 40 and the other end of arm 76 is connected to one of tubes 62 along either side panel 67 or 68. Supports posts 78 extend from a central portion of arm 76 and terminate at the outer surface of door 40 where they are connected to door 40. Each brace 75 can be manually connected between door 40 and sliding section 60 using fasteners such as bolts and nuts.

D. Rear Sliding Sections.

Referring to FIGS. 2 and 6 through 8, the portable aircraft storage system 10 further comprises rear sliding sections 80 and 100 that are coupled for telescopic sliding movement relative to the rear wall 26. Rear sliding section 80 is coupled to the rear wall 26. The rear sliding section 80 slides into and out of the enclosed space 38. The rear sliding section 80 has a case 81 that is formed by support tubes 82 and that is covered by several panels. Rear sliding section 80 is generally rectangular in shape. Tubes 82 are covered by a top panel 84, a bottom panel 85, a first side panel 87 and a second side panel 88. The panels are generally oriented to define an enclosed cavity 90 (FIG. 8) within the rear sliding section 80. Rear sliding section 80 can be formed from suitable materials such as steel. An opening 92 is defined in rear wall 26. Opening 92 is dimensioned to receive rear sliding section 60. Rear sliding section 80 can be manually moved through opening 92 between an extended position away from rear wall 26 and a retracted position within container 20. In the extended position, cavity 90 is contiguous with enclosed space 38. In one embodiment, rear sliding section 80 is retained in an extended position by a locking mechanism 94 (FIG. 8). In another embodiment, Rear sliding section 80 is supported for sliding movement relative to container 20 by a track (not shown).

Rear sliding section 100 is coupled for sliding movement to rear sliding section 80. The rear sliding section 100 slides into and out of rear sliding section 80 in a telescoping manner. The rear sliding section 100 is dimensioned to fit into rear sliding section 80 and specifically into cavity 90. The rear sliding section 100 has a case 101 that is formed by support tubes 102 and that is covered by several panels. Rear sliding section 100 is generally rectangular in shape. Tubes 102 are covered by a top panel 104, a bottom panel 105, a rear panel 106, a first side panel 107 and a second side panel 108. The panels are generally oriented to define an enclosed cavity 110 (FIG. 8) within the rear sliding section 100. Rear sliding section 100 can be formed from suitable materials such as steel. An opening 112 is defined in sliding section 80. Opening 112 is dimensioned to receive rear sliding section 60. Rear sliding section 100 can be manually moved through opening 112 between an extended position away from rear section 80 and a retracted position within rear section 80 and specifically within cavity 90. In the extended position, cavity 110 is contiguous with cavity 90. In one embodiment, rear sliding section 100 is retained in an extended position by a locking mechanism 114 (FIG. 8). In another embodiment, Rear sliding section 100 is supported for sliding movement relative to rear sliding section 80 by a track (not shown).

E. Door Opening Mechanism.

Figure 4:
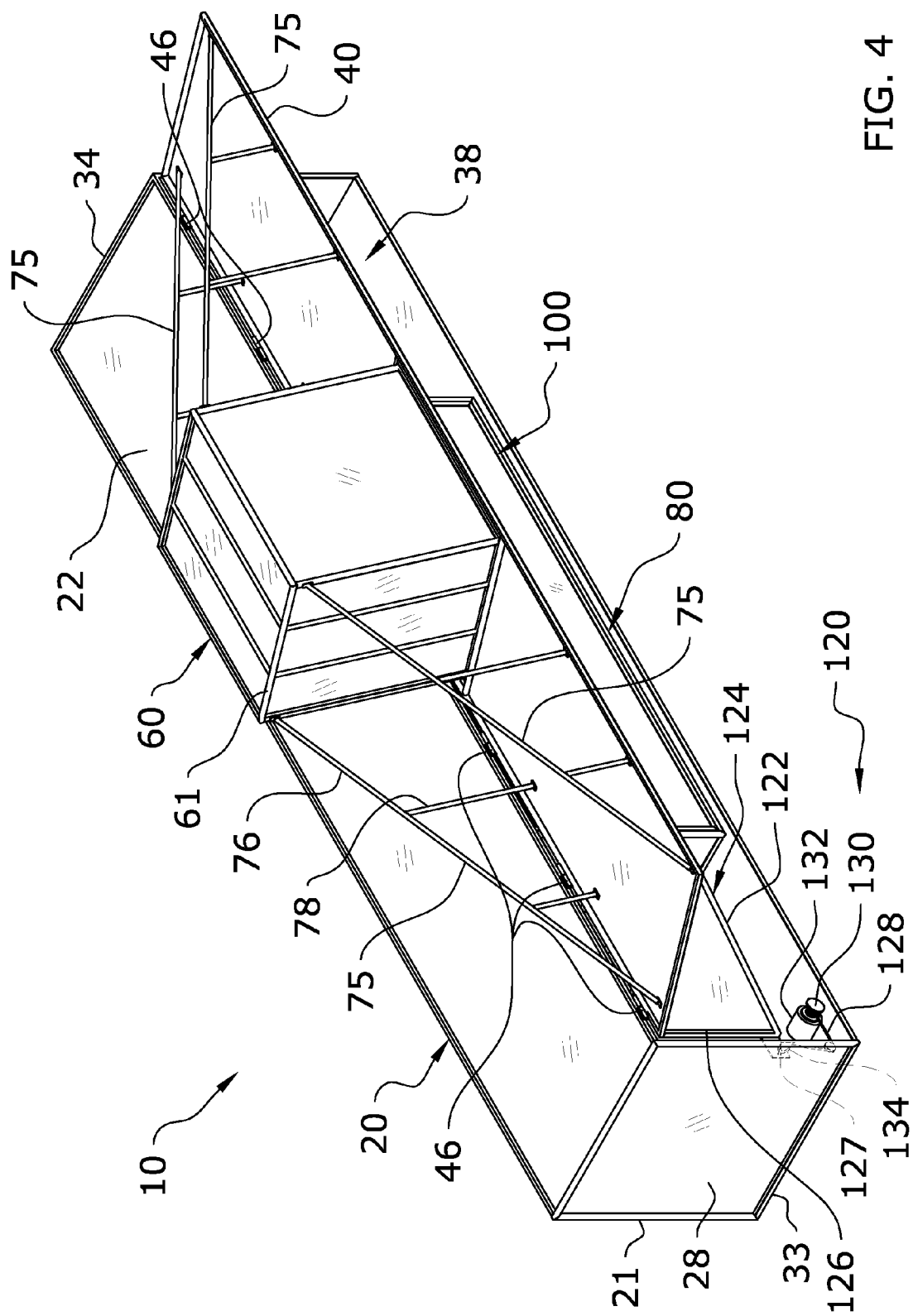
FIG. 4 is an overall upper front perspective view of the present invention with the door in an open position and the front sliding section in an extended position.
Figure 9:
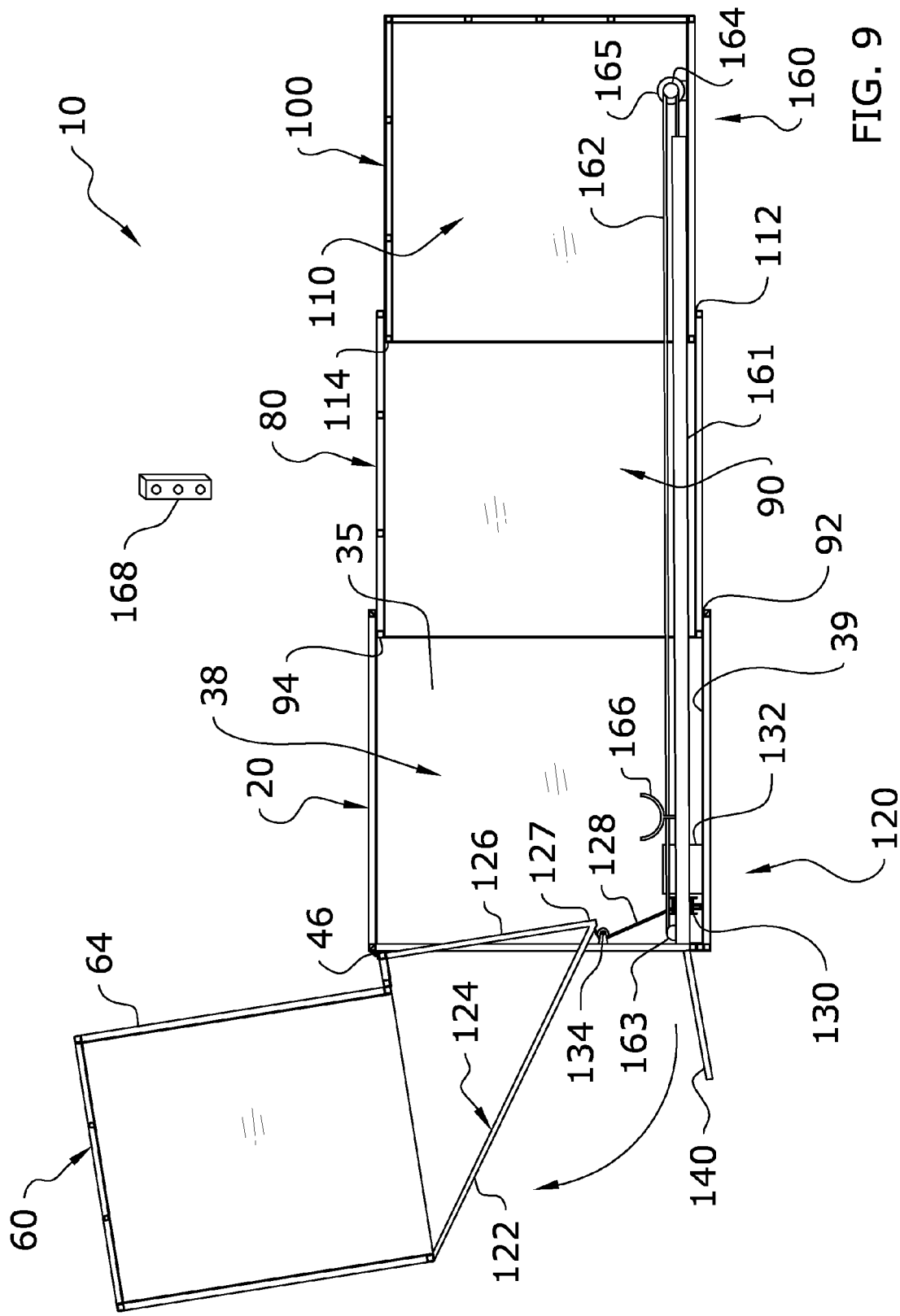
FIG. 9 is a side cross-sectional view of the aircraft storage container taken along section line 8-8 of FIG. 7 with the door in an open position and the rear sliding sections in an extended position.

As shown in FIGS. 4, 8 and 9, the portable aircraft storage system 10 further comprises a door opening mechanism 120. Door opening mechanism 120 includes a V-shaped strut 122 that is formed by a pair of legs 124 and 126. One end of leg 124 is attached to a lower part of the inside surface of door 40. One end of leg 126 is attached to an upper part of the inside surface of door 40. The other ends of legs 124 and 126 are joined together at a cable attachment point 127. A cable 128 has one end attached to cable attachment point 127. The other end of cable 128 is wound around a spool 130. Spool 130 is connected to a rotary electric motor 132. The rotary electric motor 132 is mounted to the floor 39 of bottom wall 24. A pulley 134 is mounted to frame 21 inside of container 20. Cable 128 is threaded through pulley 134. Pulley 134 guides the movement path of cable 128. The rotation of the electric motor 132 causes spool 130 to rotate. In one embodiment, a pair of moveable ramps 140 can be mounted to floor 39. The moveable ramps can slide out of container 20 such that one end of the ramp 140 rests on a ground surface and the other end of the ramp rests on floor 39. Ramps 140 can support the weight of the airplane wheels.

When the door 40 is in the closed position, as shown in FIG. 8, clockwise rotation of spool 130 causes cable 128 to be wound around spool 130, creating tension in cable 128 and pulling on strut 124 causing door 40 to rotate about hinges 46 and move to an open position. When the door 40 is in the open position, as shown in FIG. 9, counter-clockwise rotation of spool 130 causes cable 128 to be unwound from spool 130, extending cable 128 causing door 40 to rotate about hinges 46 and move to a closed position.

F. Conveyor Mechanism.

Figure 10:
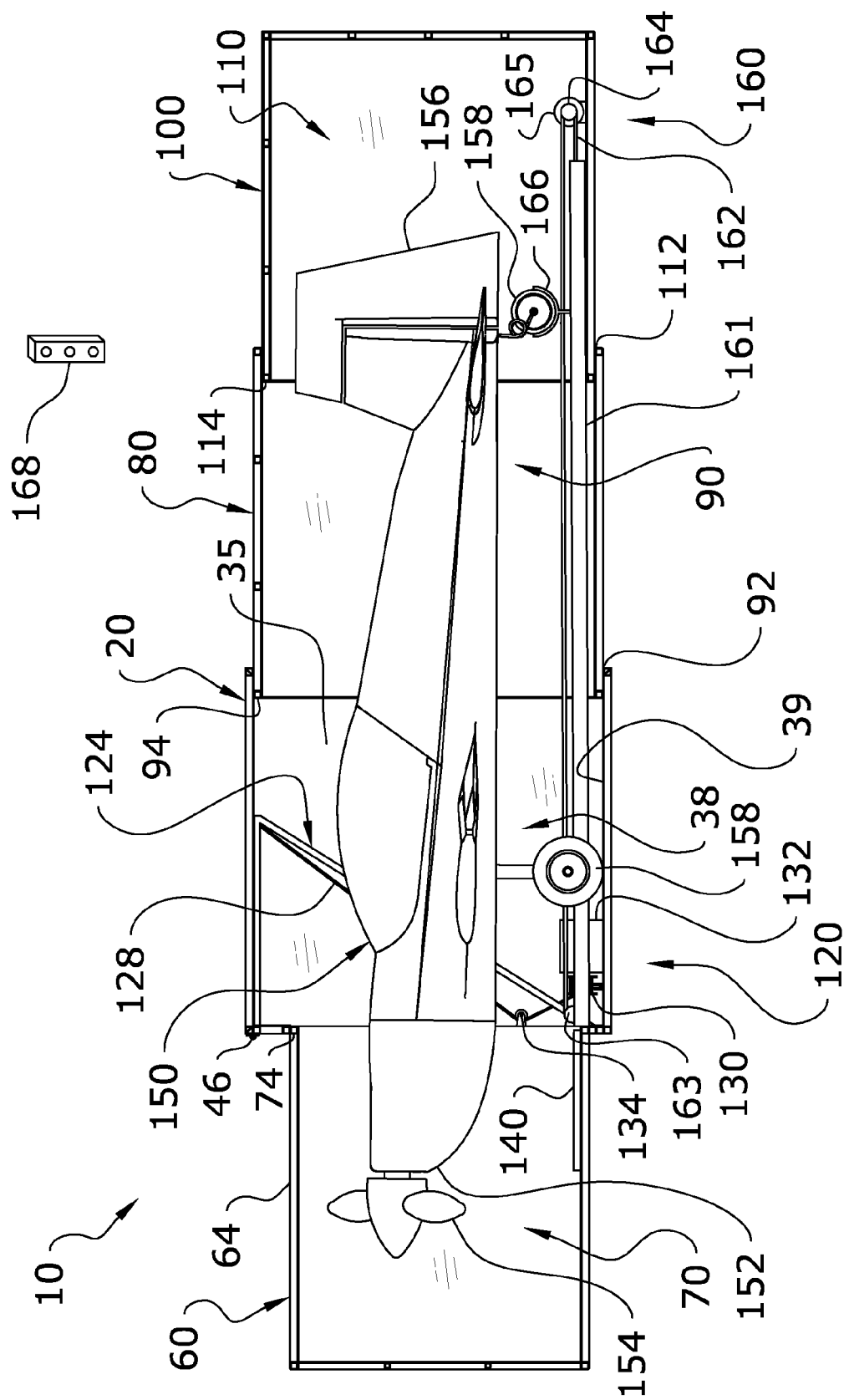
FIG. 10 is a side cross-sectional view of the aircraft storage container with the door closed and an airplane stored therein.

With reference to FIGS. 9 and 10, the portable aircraft storage system 10 further comprises a conveyor mechanism 160. Conveyor mechanism 160 includes an elongated telescoping track 161 that is mounted to the floor 39. A reversible electric motor 165 is mounted to the bottom panel 105. A pulley 163 is mounted to one end of track 161 and another pulley 164 is mounted to the other end of track 161. Pulley 164 is connected to electric motor 165. A continuous belt 162 is mounted around pulleys 163 and 164 and extends along the length of track 161. Belt 162 can be moved by the rotation of electric motor 165. A hook or cradle 166 is attached an outer surface of belt 162. Cradle 166 is dimensioned to receive tail wheel 158. A remote control 168 can wirelessly communicate with electric motor 165 and can selectively cause electric motor 165 to rotate in clockwise and counter-clockwise directions causing cradle 166 to move toward or away from door 40.

G. Operation of Preferred Embodiment.

Turning to FIG. 1, initially the portable aircraft storage system 10 and container 20 is empty and the front sliding section 60 and rear sliding sections 80 and 100 are in a refracted position within enclosed space 38. In one embodiment, container 20 can have the dimensions of a cargo shipping container such as 8.0 feet wide×8.5 feet high×40 feet long. The use of standard dimensions for container 20 allows for the use of standardized trucks and lifting equipment to readily move and transport the portable aircraft storage system 10.

Figure 5:
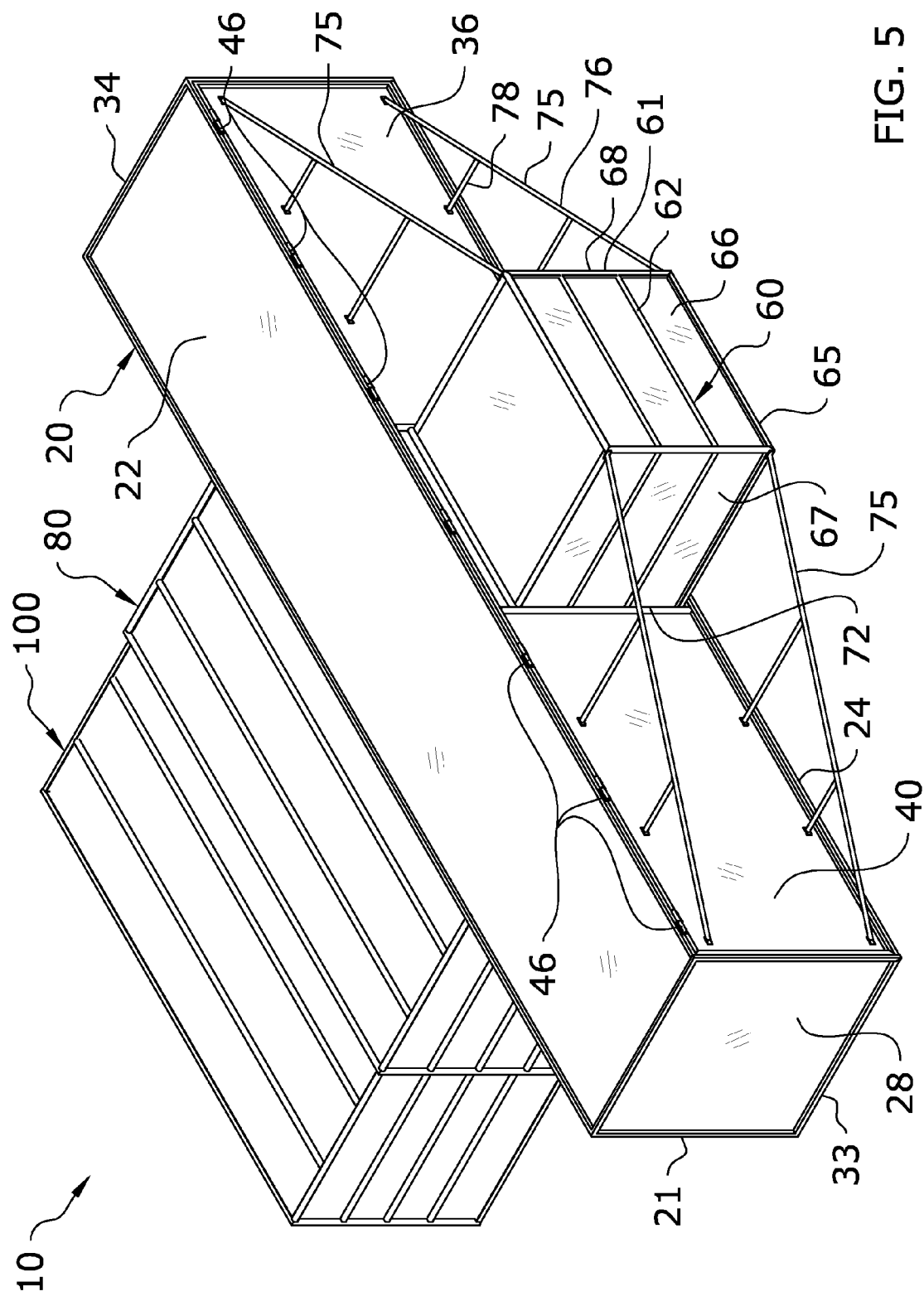
FIG. 5 is an overall upper front perspective view of the present invention with the door in a closed position, the front sliding section in an extended position and the rear sliding sections in an extended position.
Figure 6:
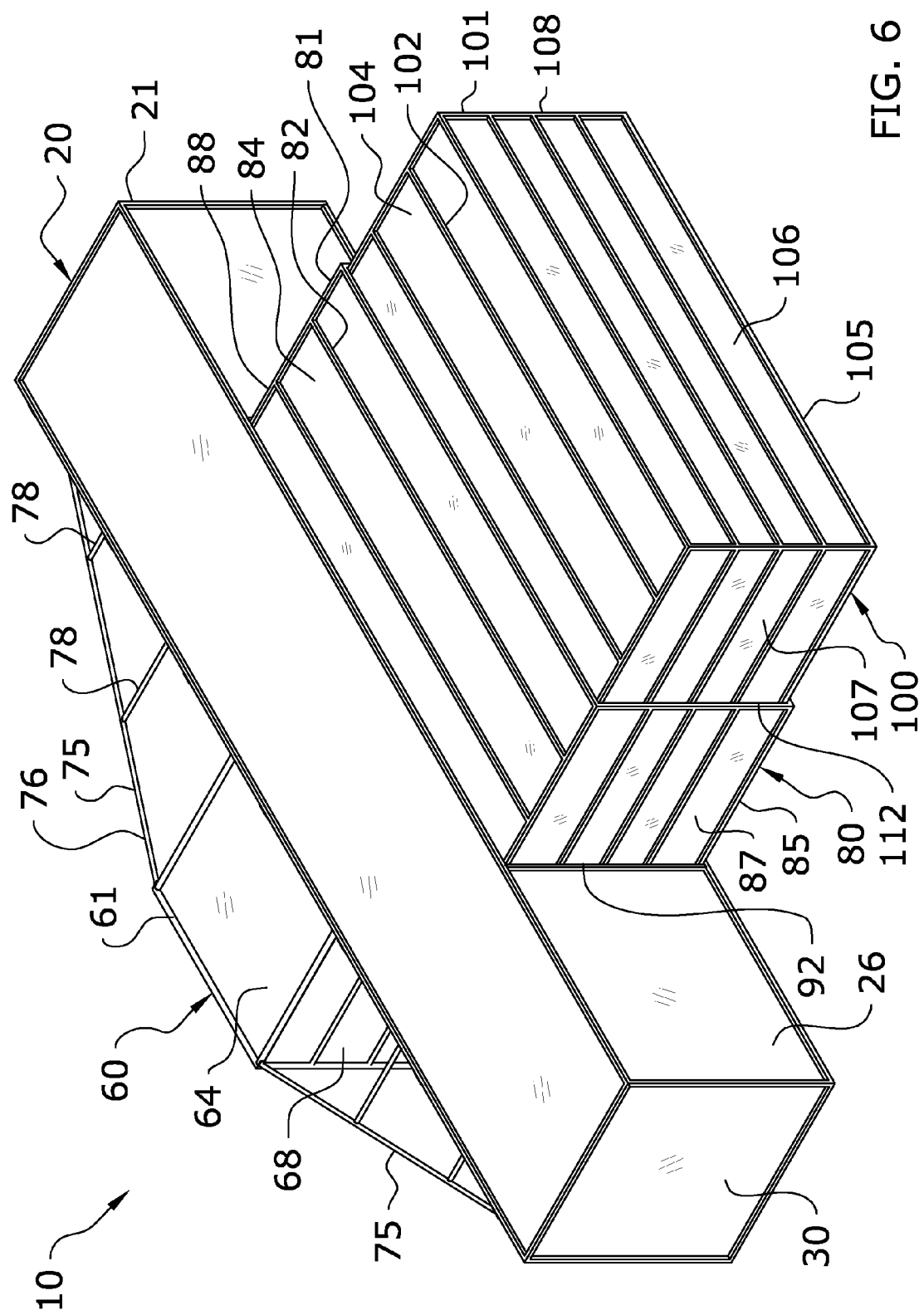
FIG. 6 is an overall upper rear perspective view of the present invention with the front sliding section in an extended position and the rear sliding sections in an extended position.
Figure 7:
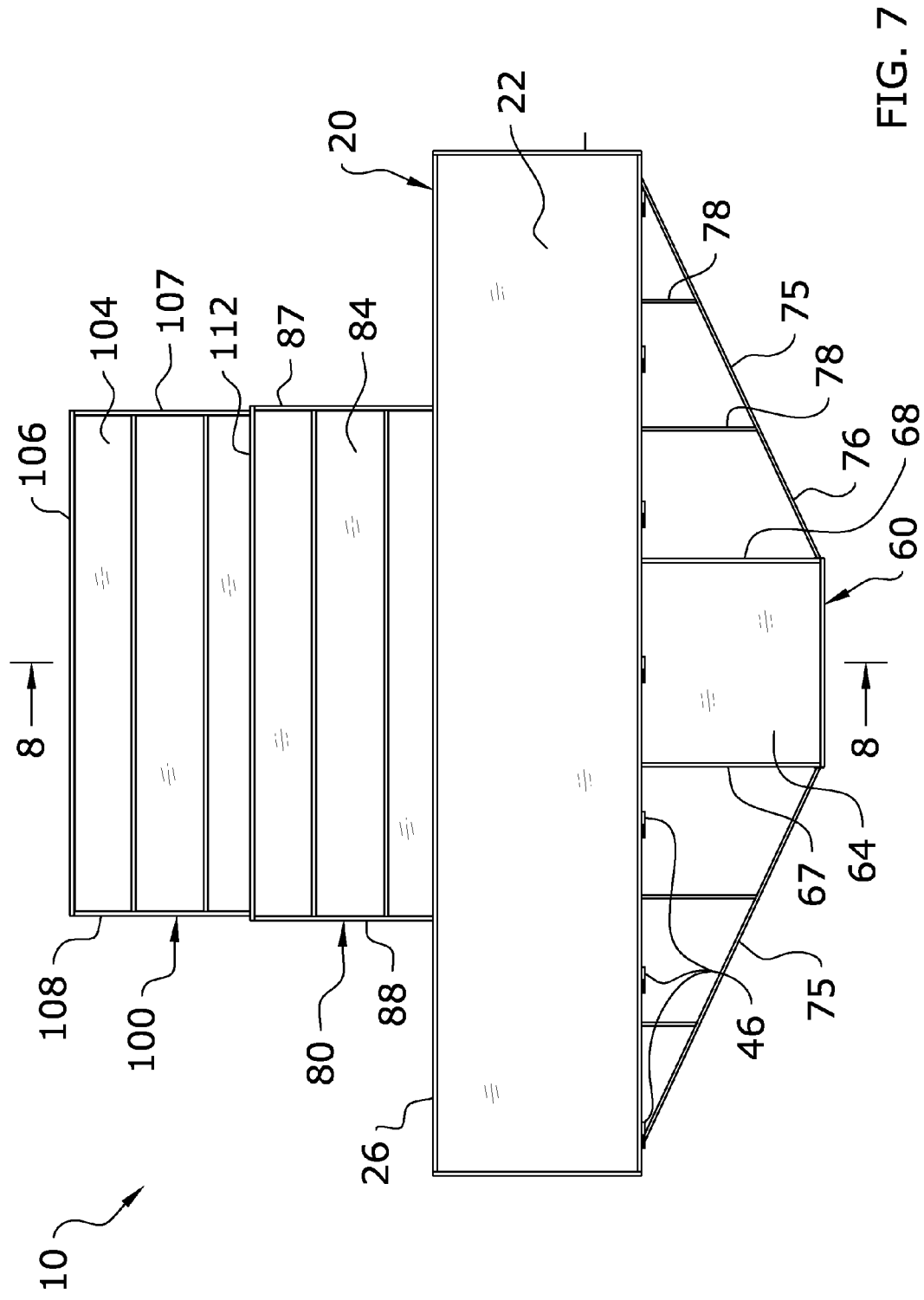
FIG. 7 is a top view of the present invention with the front sliding section in an extended position and the rear sliding sections in an extended position.

In order to store an airplane within the portable aircraft storage system 10, the sliding sections are extended. Referring to FIGS. 5 and 6, the front sliding section 60 is manually slid or pulled out from door 40 through opening 72 to an extended position as shown in FIG. 6. Braces 75 are attached to retain front sliding section 60 in the extended position. Braces 75 are manually connected between the outer surface of door 40 and tubes 62 along either side panels 67 and 68. Braces 75 are connected between door 40 and front sliding section 60 using fasteners such as bolts and nuts. After braces 75 are attached, the front sliding section 60 is locked in the extended position. Locking mechanism 74 (FIG. 8) can also be engaged to retain front sliding section 60 in an extended position.

The rear sliding section 80 is manually slid or pulled out from rear wall 26 through opening 92 to an extended position as shown in FIG. 6. After the rear sliding section 80 is in the extended position, locking mechanism 94 (FIG. 8) is engaged to retain rear sliding section 80 in an extended position. Next, the rear sliding section 100 is manually slid or pulled out from rear sliding section 80 through opening 112 to an extended position as shown in FIG. 6. The rear sliding sections 80 and 100 are telescoping. After the rear sliding section 100 is in the extended position, locking mechanism 114 (FIG. 8) is engaged to retain rear sliding section 100 in an extended position.

Door 40 can now be opened by opening mechanism 120 to allow access to enclosed space 38. Door 40 is shown in a closed position in FIG. 8. With reference to FIGS. 4 and 9, a user turning on electric motor 132 causes clockwise rotation of spool 130. The clockwise rotation of spool 130 causes cable 128 to be wound around spool 130, creating tension in cable 128 and pulling on strut 124 causing door 40 to rotate about hinges 46 and move to an open position. Door 40 is shown in an open position in FIGS. 4 and 9. Ramp 140 can now be slid out of container 20 and onto a ground surface. Referring to FIG. 10, with the door 40 in the open position and the ramp 140 extended, an airplane 150 can now be rolled on wheels 158 into portable aircraft storage system 10. Airplane 150 can be inserted or moved into portable aircraft storage system 10 using conveyor mechanism 160. Rear wheel 158 is positioned into a resting position in cradle 166. A user uses remote control 168 to turn on electric motor 165 causing cradle 166 to move away from door 40 and toward rear section 100. As the tail 156 moves toward rear section 100, the airplane is pulled into container 20. The front airplane wheels 158 roll up ramp 140 until the airplane 150 is contained within enclosed space 38. The user uses remote control 168 to stop the movement of cradle 166 after the airplane 150 is fully inside container 20.

Enclosed space 38 and cavities 70, 90 and 110 form a contiguous enclosed space. The ramp 140 is now retracted into container 20 and door 40 closed. A user turns on electric motor 132 causing a reverse or counter-clockwise rotation of spool 130. The counter-clockwise rotation of spool 130 causes cable 128 to be unwound from spool 130, extending cable 128 causing door 40 to rotate about hinges 46 and move to a closed position. Airplane 150 is now securely stored within portable aircraft storage system 10. When airplane 150 is stored in container 20, the nose 152 and propeller 154 are located within cavity 70 of front sliding section 60. Front sliding section 60 and cavity 70 provide the space to receive the nose 152 and propeller 154. The tail 156 is located at least partially within cavity 110 of rear sliding section 100. Rear sliding section 100 and cavity 100 provide the space to receive the tail 156.

Airplane 150 can be removed from portable aircraft storage system 10 using conveyor mechanism 160. When the door 40 is in an open position, the user can use remote control 168 to turn on electric motor 165 causing cradle 166 to toward door 40. As the tail 156 moves toward door 40, the airplane 150 is pushed out of container 20. The front airplane wheels 158 roll down ramp 140 until the airplane 150 is outside of the container 20. The user uses remote control 168 to stop the movement of cradle 166 after the airplane 150 is fully outside of container 20.

The use of portable aircraft storage system 10 has several advantages. First, when container 20 is in a fully retracted position, the portable aircraft storage system 10 can be readily transported to remote locations using standard trailers and lifting equipment. Second, the portable aircraft storage system 10 can be quickly deployed at a remote location to provide secure aircraft storage by extending the front sliding section 60 and the rear sliding sections 80 and 100 and opening door 40. Third, the opening mechanism 120 allows for a user to readily open and close door 40 to gain access to the enclosed space 38 and fourth the use of front sliding section 60 provides sufficient space to receive the nose 152 and propeller 154 of airplane 150.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A portable aircraft storage system comprising:
a housing having a top wall, a bottom wall, a front wall, a rear wall opposite of the front wall, a first side wall and a second side wall, the walls connected to form an enclosed space within the housing, and wherein said enclosed space has a longitudinal axis extending from said first side wall to said second side wall;
a first sliding section moveably coupled to the front wall, the first sliding section adapted to slide into and out of the enclosed space along an axis that is transverse to the longitudinal axis of the housing, wherein the first side wall has an opening for receiving the first sliding section, and wherein the first sliding section is configured to receive a nose section of the airplane;
at least one hinge connected between the top wall and the front wall, wherein both the front wall and the first sliding section are adapted to be pivotally raised together into an open position or lowered together into a closed position about the hinge; and
a second sliding section moveably coupled to the rear wall, the second sliding section adapted to slide into and out of the enclosed space along an axis that is transverse to the longitudinal axis of the housing and wherein said second sliding section is configured to receive a tail section of the airplane;
wherein said housing, said first sliding section and said second sliding section form a cross-shaped structure when said first sliding section and said second sliding section are each in an extended position;
wherein said housing, said first sliding section and said second sliding section form an elongated rectangular structure when said first sliding section and said second sliding section are each in a retracted position.

2. The portable aircraft storage system of claim 1, further comprising:
a third sliding section moveably coupled to the second sliding section, wherein the third sliding section is adapted to move into and out of the second sliding section.

3. The portable aircraft storage system of claim 1, further comprising:
an opening mechanism coupled between the bottom wall and the front wall, the opening mechanism adapted to move the front wall between the open and the closed position.

4. The portable aircraft storage system of claim 3, wherein the opening mechanism comprises a strut coupled to the front wall and a cable coupled to a spool.

5. The portable aircraft storage system of claim 1, further comprising:
at least one brace coupled between the front wall and the first sliding section.

6. The portable aircraft storage system of claim 1, wherein the enclosed space is configured to receive at least one airplane.

7. The portable aircraft storage system of claim 1, further comprising:

a conveyor mechanism mounted to said bottom wall of said housing for moving an aircraft into or out of said enclosed space.

8. A portable aircraft storage system comprising:
a housing having a top wall, a bottom wall, a rear wall, a first side wall and a second side wall, the walls connected to form an enclosed space within the container, and wherein said enclosed space has a longitudinal axis extending from said first side wall to said second side wall;
a door moveably coupled to the top wall by a hinge such that the door pivots about the top wall;
a first sliding section moveably coupled to the door, the first sliding section adapted to slide into and out of the enclosed space along an axis that is transverse to the longitudinal axis of the housing, wherein the door has an opening for receiving the first sliding section, and wherein the first sliding section is configured to receive a nose section of the airplane, wherein both the first sliding section and the door are adapted to be pivotally raised together into an open position or pivotally lowered together into a closed position; and
a second sliding section moveably coupled to the rear wall, the second sliding section adapted to slide into and out of the enclosed space along the axis that is transverse to the longitudinal axis of the housing and wherein said second sliding section is configured to receive a tail section of the airplane;
wherein said housing, said first sliding section and said second sliding section form a cross-shaped structure when said first sliding section and said second sliding section are each in an extended position;
wherein said housing, said first sliding section and said second sliding section form an elongated rectangular structure when said first sliding section and said second sliding section are each in a retracted position.

9. The portable aircraft storage system of claim 8, further comprising:
a third sliding section moveably coupled to the second sliding section, wherein the third sliding section is adapted to move into and out of the second sliding section.

10. The portable aircraft storage system of claim 8, further comprising:
an opening mechanism coupled between the bottom wall and the door, the opening mechanism adapted to move the door.

11. The portable aircraft storage system of claim 10, wherein the opening mechanism comprises a strut coupled to the front wall and a cable coupled to a spool.

12. The portable aircraft storage system of claim 8, further comprising:
at least one brace coupled between the front wall and the first sliding section.

13. The portable aircraft storage system of claim 8, wherein the enclosed space is configured to receive at least one airplane.

14. A portable aircraft storage system comprising:
a housing having a top wall, a bottom wall, a rear wall, a first side wall and a second side wall, the walls connected to form an enclosed space within the container, and wherein said enclosed space has a longitudinal axis extending from said first side wall to said second side wall;

a door moveably coupled to the top wall by a hinge such that the door pivots about a horizontal axis extending along the top wall between the first side wall and the second side wall;

a first sliding section moveably coupled to the door, the first sliding section adapted to slide into and out of the enclosed space as a unitary structure between a first extended position and a first retracted position along an axis that is transverse to the longitudinal axis of the housing, wherein the door has an opening for receiving the first sliding section, and wherein the first sliding section is configured to receive a nose section of the airplane, wherein both the first sliding section and the door are adapted to be pivotally raised together into an open position or pivotally lowered together into a closed position;

a second sliding section moveably coupled to the rear wall, the second sliding section adapted to slide into and out of the enclosed space as a unitary structure between a second extended position and a second retracted position along the axis that is transverse to the longitudinal axis of the housing and wherein said second sliding section is configured to receive a tail section of the airplane;

a third sliding section movably coupled to the second sliding section, the third sliding section adapted to slide into and out of the second sliding section as a unitary structure between a third extended position and a third retracted position along the axis that is transverse to the housing;

a first brace removably connected between the first sliding section and the door when the first sliding section is in the first extended position, wherein the first brace comprises a first support arm extending diagonally between a first side of the first sliding section and a first side of the door, wherein the first brace further comprises a plurality of first support posts extending between the first support arm and the door; and a second brace removably connected between the first sliding section and the door when the first sliding section is in the first extended position, wherein the second brace comprises a second support arm extending diagonally between a second side of the first sliding section and a second side of the door, wherein the second brace further comprises a plurality of second support posts extending between the second support arm and the door;

wherein said housing, said first sliding section and said second sliding section form a cross-shaped structure when said first sliding section and said second sliding section are each in an extended position;

wherein said housing, said first sliding section and said second sliding section form an elongated rectangular structure when said first sliding section and said second sliding section are each in a retracted position.

* * * * *